(12) United States Patent
Edwards et al.

(10) Patent No.: US 11,412,726 B1
(45) Date of Patent: Aug. 16, 2022

(54) REVERSIBLE ROD HOLDER APPARATUS AND METHOD

(71) Applicants: Taylor Lee Edwards, Pensacola, FL (US); John D. Martelli, Pensacola, FL (US)

(72) Inventors: Taylor Lee Edwards, Pensacola, FL (US); John D. Martelli, Pensacola, FL (US)

( * ) Notice: Subject to any disclaimer, the term of this patent is extended or adjusted under 35 U.S.C. 154(b) by 59 days.

(21) Appl. No.: 16/835,489

(22) Filed: Mar. 31, 2020

Related U.S. Application Data

(60) Provisional application No. 62/922,321, filed on Aug. 5, 2019.

(51) Int. Cl.
*A01K 97/10* (2006.01)
*A01K 97/22* (2006.01)
*A01K 97/08* (2006.01)

(52) U.S. Cl.
CPC .............. *A01K 97/10* (2013.01); *A01K 97/08* (2013.01); *A01K 97/22* (2013.01)

(58) Field of Classification Search
CPC ......... A01K 97/10; A01K 97/08; A01K 97/22
USPC ........... 211/70.8; 43/21.2; 224/922; 248/511, 248/512, 525, 527
See application file for complete search history.

(56) References Cited

U.S. PATENT DOCUMENTS

| | | | | |
|---|---|---|---|---|
| 2,536,797 A | * | 1/1951 | Cooke | B60R 9/08 224/568 |
| 2,552,879 A | * | 5/1951 | Woerner | B60R 9/08 224/317 |
| 3,327,978 A | * | 6/1967 | Gates | A01K 97/10 248/520 |
| 3,824,730 A | * | 7/1974 | Johnson | A01K 97/10 43/17 |
| 3,897,646 A | * | 8/1975 | Sheets | A01K 97/11 43/15 |
| 4,355,818 A | * | 10/1982 | Watts | A01K 97/22 280/654 |
| 4,628,628 A | * | 12/1986 | Burgin | A01K 97/06 206/315.11 |
| 5,054,737 A | * | 10/1991 | DeLancey | A01K 97/10 248/515 |
| 5,063,701 A | * | 11/1991 | Ottens | A01K 97/10 43/21.2 |
| 5,121,565 A | * | 6/1992 | Wille | A01K 97/10 43/21.2 |
| 5,815,976 A | * | 10/1998 | Jernigan | A01K 97/10 43/21.2 |
| 5,836,103 A | * | 11/1998 | Taylor | A01K 97/08 43/26 |
| 5,899,527 A | * | 5/1999 | Elvidge | A01K 97/22 297/188.14 |

(Continued)

*Primary Examiner* — Timothy D Collins
*Assistant Examiner* — Nicholas Leo Seneczko
(74) *Attorney, Agent, or Firm* — T. Nevin Shaffer, Jr.

(57) ABSTRACT

A reversible rod holder apparatus and method consists of a frame with a front, a back, a top side, a bottom side, a left side and a right side. An attachment plate is connected with the back of the frame. A support is provided where the support and the attachment plate are removably connectable and a rod sleeve is connected with the front of the frame at an angle from the left side to the right side of the frame such that a rod placed in the rod sleeve is held at that angle.

20 Claims, 9 Drawing Sheets

(56) References Cited

U.S. PATENT DOCUMENTS

| | | | | |
|---|---|---|---|---|
| 5,979,102 A * | 11/1999 | Sagryn | A01K 97/08 | 114/364 |
| 6,003,746 A * | 12/1999 | Richardson | A01K 97/10 | 224/162 |
| 6,003,748 A * | 12/1999 | Rivenbark | B60R 9/08 | 211/70.8 |
| 6,082,757 A * | 7/2000 | Lin | A01K 97/22 | 16/429 |
| 6,267,425 B1 * | 7/2001 | Dorsey | A01K 97/08 | 211/70.8 |
| 6,341,443 B1 * | 1/2002 | Watford | A01K 97/10 | 43/17 |
| 6,962,354 B1 * | 11/2005 | Miller | A01K 97/08 | 280/47.26 |
| 7,155,859 B1 * | 1/2007 | Brooks | A01K 97/06 | 206/315.11 |
| 8,746,469 B1 * | 6/2014 | De La Torre | B60R 9/08 | 211/70.8 |
| 9,861,087 B1 * | 1/2018 | Arrazola | A47B 81/005 | |
| 9,986,827 B1 * | 6/2018 | Long | B60B 33/0021 | |
| 10,798,930 B1 * | 10/2020 | Rodriguez | A01K 97/10 | |
| 2004/0237378 A1 * | 12/2004 | Fraser | A01K 97/22 | 43/54.1 |
| 2005/0126064 A1 * | 6/2005 | Winkler | A01K 97/22 | 43/21.2 |
| 2006/0102824 A1 * | 5/2006 | Carnevali | F16M 11/10 | 248/534 |
| 2006/0237501 A1 * | 10/2006 | Gonzalez | A01K 97/08 | 224/325 |
| 2006/0277814 A1 * | 12/2006 | Lucky | A01K 97/10 | 43/21.2 |
| 2007/0044367 A1 * | 3/2007 | Slatter | A01K 97/22 | 43/21.2 |
| 2011/0179692 A1 * | 7/2011 | McKnight | A01K 97/08 | 43/21.2 |
| 2014/0125075 A1 * | 5/2014 | Xiques | A01K 97/08 | 294/143 |
| 2014/0263113 A1 * | 9/2014 | Hall, II | B60R 7/08 | 211/70.8 |
| 2015/0060378 A1 * | 3/2015 | Bestor | A47B 81/005 | 211/70.8 |
| 2015/0201601 A1 * | 7/2015 | Honermann | A01K 97/22 | 211/70.8 |
| 2015/0359210 A1 * | 12/2015 | Rossi | A01K 97/10 | 43/21.2 |
| 2016/0045024 A1 * | 2/2016 | Roberts | A47F 7/0028 | 248/512 |
| 2018/0110335 A1 * | 4/2018 | O'Hagan | A01K 97/22 | |
| 2018/0125050 A1 * | 5/2018 | Smith | A45F 3/44 | |
| 2018/0265013 A1 * | 9/2018 | Beznes | A01K 97/10 | |
| 2018/0353357 A1 * | 12/2018 | Lane | A47C 7/62 | |

* cited by examiner

REVERSIBLE ROD HOLDER APPARATUS AND METHOD

CROSS REFERENCE TO RELATED APPLICATION

This application claims the benefit of previously filed U.S. provisional patent application No. 62/922,321 filed Aug. 5, 2019 for a "Fishing pole holder that attaches to the window. (Fishing pole/rod holder window attachment". The Applicants hereby claim the benefit of this provisional application under 35 U.S.C. §119. The entire content of this provisional application is incorporated herein by this reference.

FIELD OF THE INVENTION

This invention relates to a reversible rod holder apparatus consisting of a frame with a front, a back, a top side, a bottom side, a left side and a right side. An attachment plate is connected with the back of the frame. A support is provided where the support and the attachment plate are removably connectable and a rod sleeve is connected with the front of the frame at an angle from the left side to the right side of the frame such that a rod placed in the rod sleeve is held at that angle.

BACKGROUND OF THE INVENTION

A problem exists in the field of transporting rods, such as fishing rods, by way of example and not limitation. Commercial businesses have no problem safely securing poles of all sorts such as PVC piping, metal, wood or the like. This is not true, however, for the home "do it yourself" person or weekend warrior fisherman. The normal solution for them is to stick the fishing pole, again for example only, in the vehicle, car, truck or boat, with the end of the pole(s) hanging out, of the window or over the side. This leaves the pole exposed to wind damage as the poles are forced into the side of the vehicle as it travels to its intended location.

Further, when there is more than one pole, as is often the case when fishing, there is no easy means or method for transporting multiple poles to and from the vehicle other than grabbing an armful.

Still further, the common present method of transporting rods and poles leaves them exposed to theft during stops.

Thus, there is a need in the art for pole transportation device that addresses these problems in a manner that is economical, safe and easy to use.

It therefore is an object of this invention to provide a rod holder that prevents damage to rods during transport, secures them from theft and provides a manageable way to carry them from place to place.

SUMMARY OF THE INVENTION

Accordingly, the reversible rod holder apparatus and method of the present invention, according to one embodiment, includes a reversible rod holder apparatus consisting of a frame with a front, a back, a top side, a bottom side, a left side and a right side. An attachment plate is connected with the back of the frame. A support is provided where the support and the attachment plate are removably connectable and a rod sleeve is connected with the front of the frame at an angle from the left side to the right side of the frame such that a rod placed in the rod sleeve is held at that angle.

All terms used herein are given their common meaning so that "rod", for example, identifies and describes an object longer than it is wide such as a pipe or, again, fishing pole.

In one aspect, the invention further includes a handle connected with the frame.

In another aspect, a tether is connected with the frame.

In a further aspect, the attachment plate is oriented from the top of the frame to the bottom of the frame and is configured to removably connect with the support from either the top or the bottom.

In one aspect, the rod sleeve connection angle is approximately four degrees.

In one aspect, the support is removably connectable with another object and in a further aspect, the "another object" is a window in a vehicle.

In another aspect, the front of the frame is connected with the back of the frame at the selected angle such that the rod sleeve connected with the front of the frame is connected at that selected angle.

In one aspect, the rod sleeve includes the selected angle such that the rod sleeve when connected with the front of the frame is connected at that angle. As used herein, the term "selected angle" describes any user preferred angle deemed useful in furtherance of the objectives of the invention. Again, Applicants have found that a preferred angle is approximately four degrees. Certainly angles other than four degrees, one to forty-five or more, for example, may be useful as well according to user preference and type of rods. As a result of this structure, when the invention is in place on a vehicle, the side facing the rear of the vehicle extends further away from the vehicle than the side at the front of the vehicle. The rods held at an angle still move toward the vehicle due to wind from movement of the vehicle and yet are prevented from damaging themselves or the vehicle since they are spaced apart from the vehicle by the angle.

According to another embodiment, a reversible rod holder apparatus includes a frame with a front, a back, a top side, a bottom side, a left side and a right side. An attachment plate is connected with the back of the frame where the attachment plate is oriented from the top of the frame to the bottom of the frame and is configured to removably connect with a support from either the top or the bottom. Rod sleeves are connected with the front of the frame at an angle from the left side to the right side of the frame such that rods placed in the rod sleeves are held at that angle. Clamps are connected with the rod sleeves where the clamps are configured to hold rods in the rod sleeves and a pair of handles are connected to the frame and are configured to receive a lock such that rods in the rod sleeves are locked in place.

In one aspect, a tether is connected with the frame.

In another aspect, the rod sleeve connection angle is approximately four degrees.

In a further aspect, the left side of the frame and the right side of the frame space the front of the frame apart from the back of the frame and one side extends further from the back than the other side such that the front is connected with the first side and the second side at the selected. angle.

In another aspect, the left side and the right side include side holes.

In one aspect, the rods include reels and the rod sleeves include reel receiving cut outs and in a further aspect, the lock is configured to lock around reels in the reel receiving cut outs.

In one aspect, the frame includes lock posts configured to receive a lock.

In another aspect, the support is removably connectable with another object and in one aspect the "another object" is a window in a vehicle.

According to another embodiment, a reversible rod holder method consists of:

a. providing a frame with a front, a back, a top side, a bottom side, a left side and a right side; an attachment plate connected with the back of the frame; a support wherein the support and the attachment plate are removably connectable; a rod sleeve connected with the front of the frame at an angle from the left side to the right side of the frame such that a rod placed in the rod sleeve is held at said angle; and b. connecting the attachment plate with the support.

In one aspect, the method further includes the steps of:

a. connecting the support with another object; and b. placing a rod in the rod sleeve.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
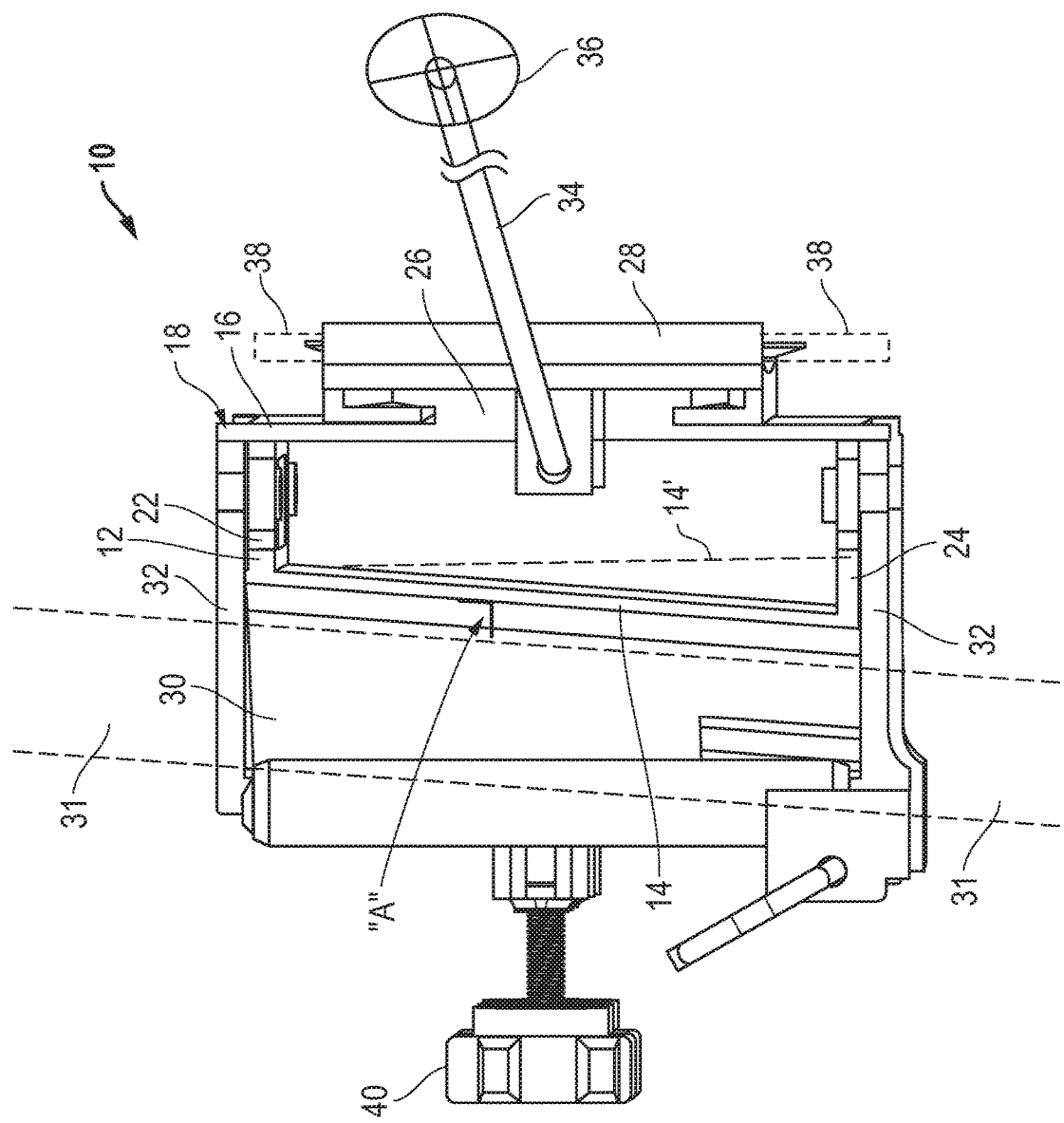
FIG. 1 is a top view of the reversible rod holder of the present invention shown with the frame to the left of the support.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein so far as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-9. With specific reference to FIGS. 1 and 2, reversible rod holder apparatus and method 10 consists of a frame 12 with a front 14, a back 16, a top side 18, a bottom side 20, a left side 22 and a right side 24. An attachment plate 26 is connected with the back 16 of the frame 12. A support 28 is provided where the support 28 and the attachment plate 26 are removably connectable with each other. Here the term "removably connectable" describes a mechanical connection that allows secure but releasable connection of one object with another as will be described more fully hereafter.

A rod sleeve is 30 connected with the front 14 of the frame 12 at an angle "A" from the left side 22 to the right side 24 of the frame 12 such that a rod (shown in dotted lines for clarity) placed in the rod sleeve 30 is held at that the desired angle "A". Angle "A" can be any useful angle that satisfies the purposes of the invention and Applicants have found that an approximately four degree angle is preferred.

The term "rod sleeve" describes a structure as shown that either partially or totally surrounds a rod when the rod is located within the rod sleeve.

Angle "A" is an important structural feature of the present invention. However this angle "A" is created is suitable. That is, as shown in the Figures, Applicants show the angle created by angling the front 14 of the frame from the left side 22 to the right side 24 with the rod sleeve(s) 30 attached to the angled front 14 thus providing the desired angle "A" to the rod sleeves 30. Certainly, it is understood that the front 14 of frame 12 could be parallel to the back 16 (see dotted line (14') in FIG. 1 between the left side 22 and the right side 24) and the rod sleeves 30 themselves can include the angle "A".

Figure 2:
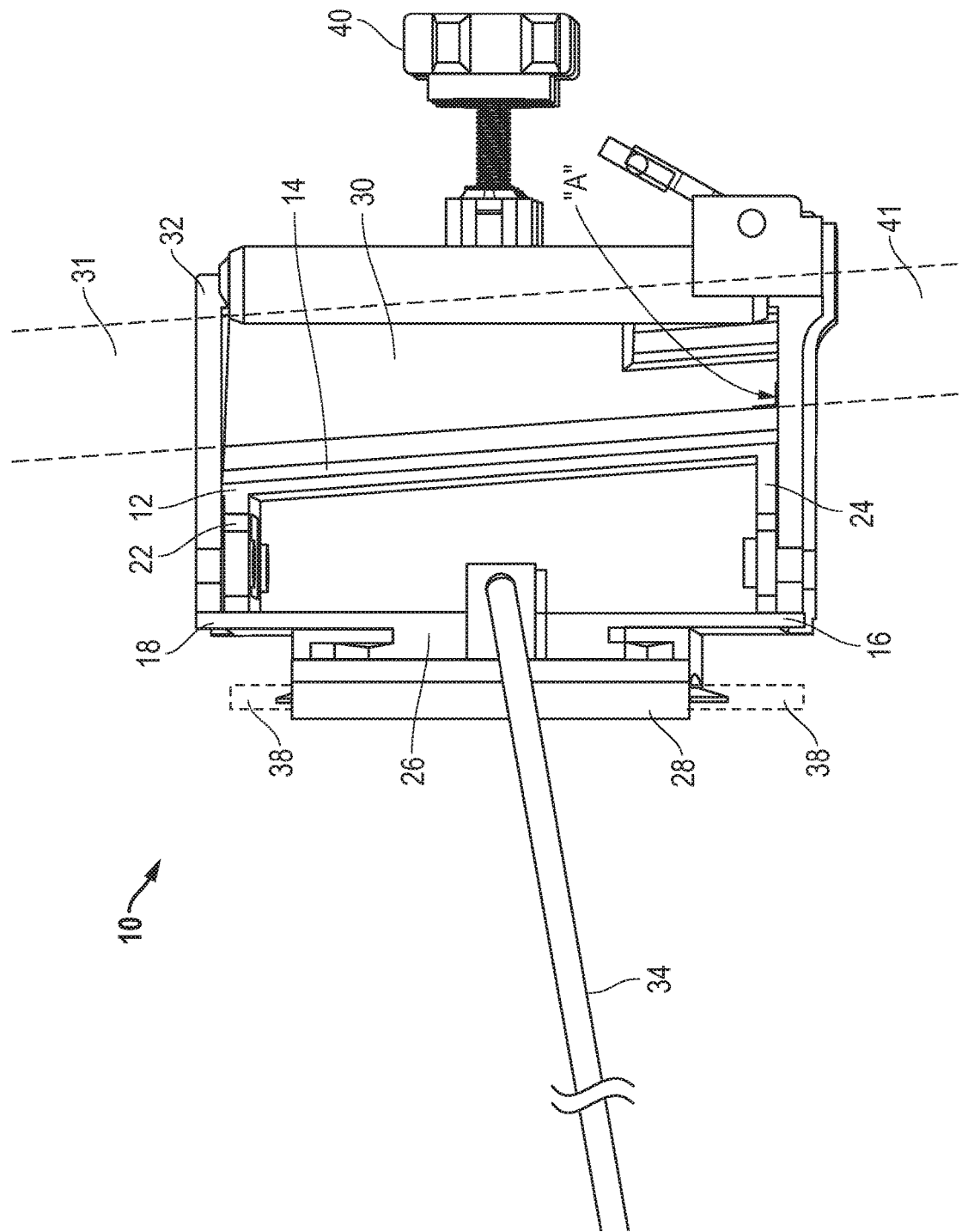
FIG. 2 is a top view of the invention of FIG. 1 shown with the frame to the right of the support.

Still referring to FIGS. 1 and 2, the invention includes handle 32 connected with the frame 12 and preferably two handles 32, as shown, one handle on the left side 22 of frame 12 and one handle 32 on the right side 24 of frame 12.

In another aspect, a tether 34 is connected with the frame 12. Tether 34 extends from its connection with frame 12 so that the other end of the tether 34 may be connected to another object such as the steering wheel 36 of a vehicle for example only and not by way of limitation. This secures the reversible rod holder apparatus 10 from unauthorized removal as a whole. In use, frame 12 is connected with support 28 and support 28 is connected with another object such as a vehicle window 38, Without the tether 34, even though rods 31 may be locked to frame 12, as will be described more fully hereafter, the entire structure could be removed if it were not for tether 34.

FIGS. 1 and 2 show a clamp 40. Clamp 40 is connected with the rod sleeves 30 and is configured to hold rods 31 against movement within the rod sleeves 31. Clamp 40 includes a knob connected with a shaft, as shown, such that when the knob is turned in one direction the shaft is caused to press against a rod 31 when the rod is in rod sleeve 31 and when the knob of clamp 40 is turned in another direction the shaft is lifted so as to release the rod 31, Other types of clamps are included as are now known or hereafter provided for temporarily securing rods 31.

Comparing FIG. 1 with FIG. 2, the "reversible" structure of the invention is illustrated by observing in FIG. 1, which shows the invention attached to the left side window, rod 31 is facing toward the rear of the window/vehicle with the rod 31 angled away from the support 26 and window 38. Thus, as a vehicle moves, the rod 31 is not slammed into the vehicle. Likewise, FIG. 2 shows frame 12 turned one-hundred eighty degrees and connected with support 28 on the right side of a vehicle such that angle "A" is maintained on that side. That is, in FIG. 2 rod 31 facing the rear of the vehicle is angled away from the vehicle on that side as well. If the invention was not "reversible" the angle "A" in one location would actually direct or tilt the rods 31 into the vehicle not away from it.

Figure 3:
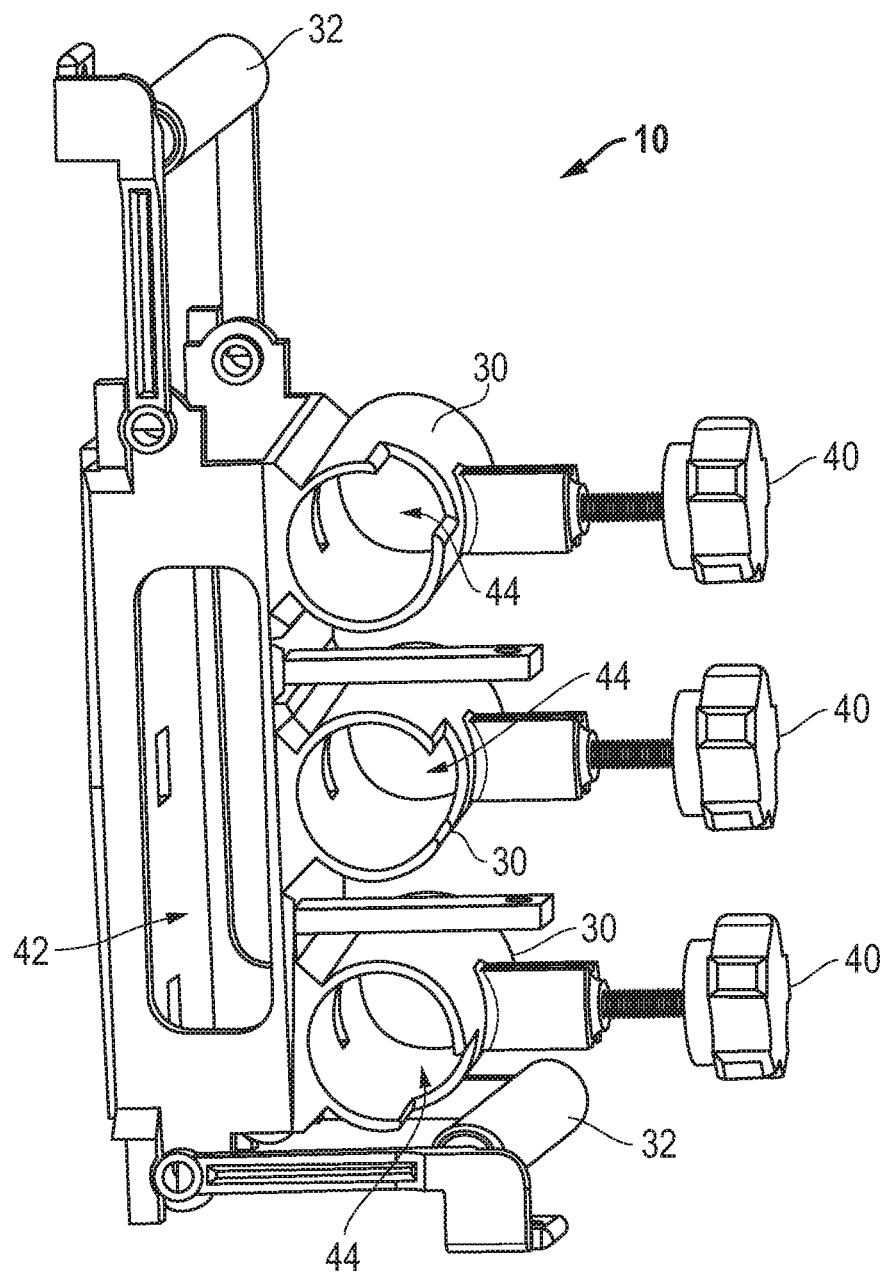
FIG. 3 is a side view of the invention of FIG. 1 with one handle extended for carrying.

Referring now to FIG. 3, reversible rod holder 10 is shown with one handle 32 extended for carrying frame 12 when not connected with support 28, with or without rods 31 (not shown for clarity). As shown, preferably there is more than one rod sleeve 30 and a corresponding number of clamps 40.

FIG. 3 also shows other features of the invention, In one aspect, the left side 22 and the right side 24 of frame 12 include side holes 42. Applicants have found from testing that side holes 42 unexpectedly greatly reduce wind noise, whistling and drag.

Also, FIG. 3 shows that preferably rod sleeves 31 include reel receiving cut outs 44. When present, and when used in a preferred embodiment for unsporting multiple fishing rods, the reels on the rod (not shown for clarity) are attached to the rod and extend from the rod. Reel receiving cut out 44 provides a structure that allows the reel to be securely fit within rod sleeve 30 and then held in place by clamp 40.

Figure 4:
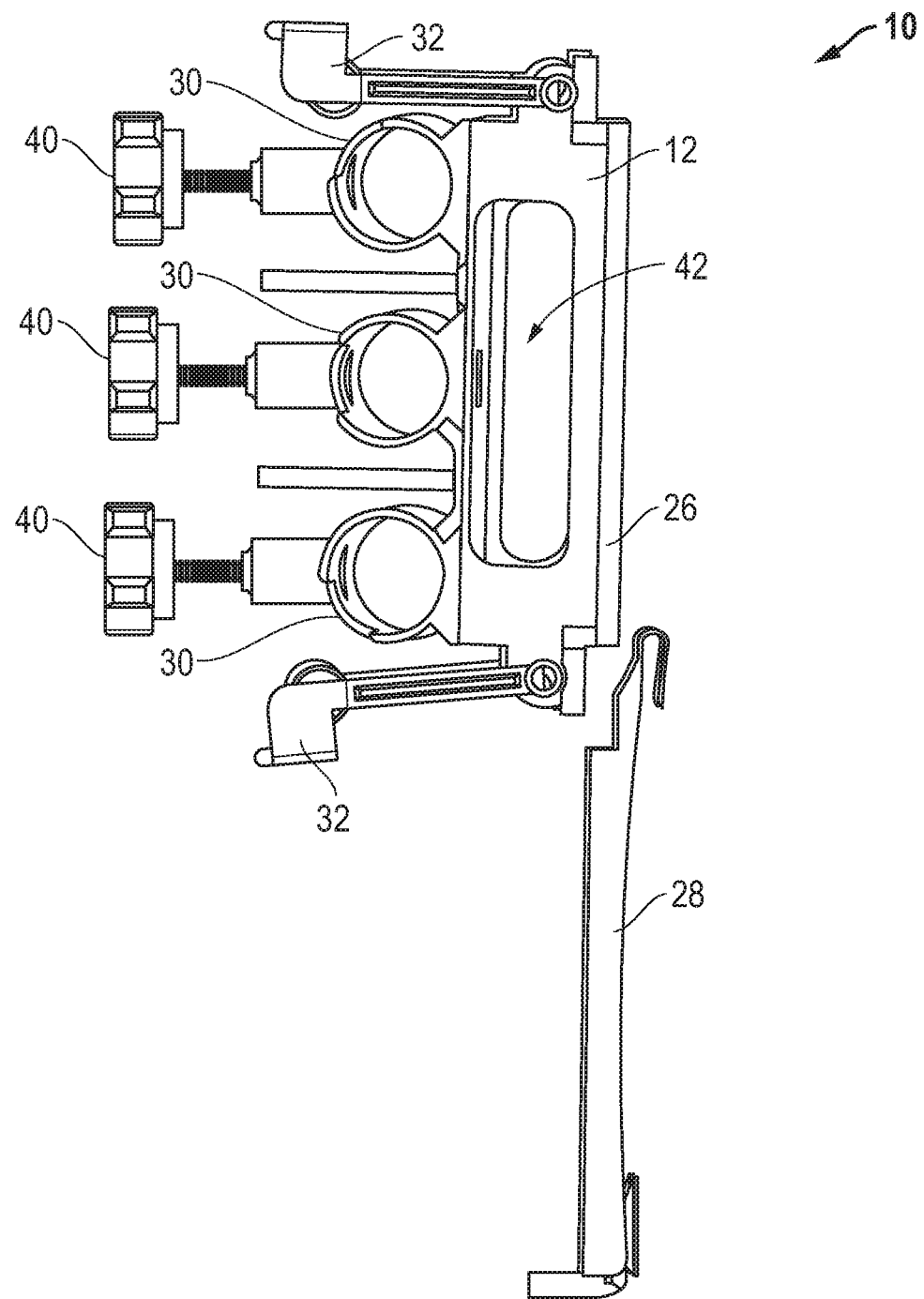
FIG. 4 is a side view of the invention of FIG. 1 showing the frame and support prior to connection.
Figure 5:
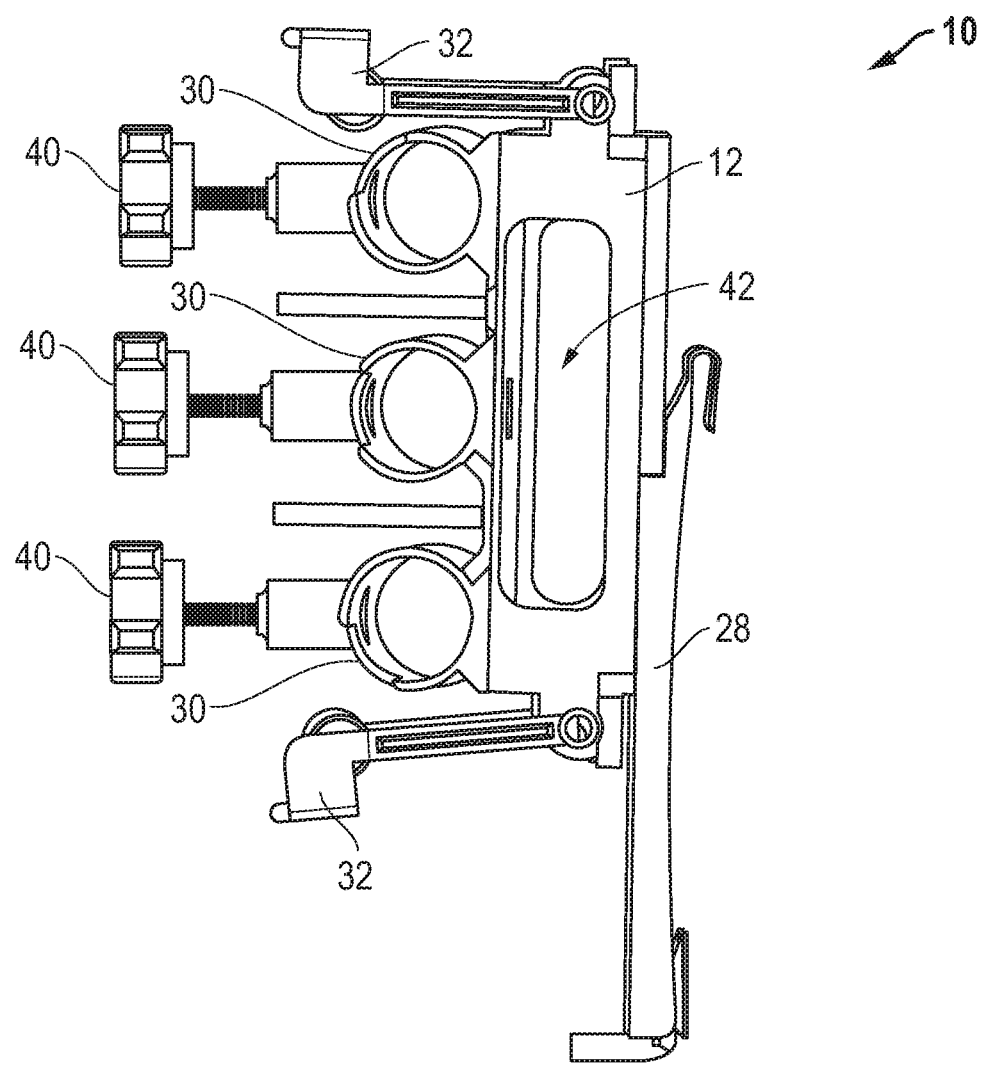
FIG. 5 is a side view of the invention of FIG. 4 showing the frame and support. partially connected.

FIG. 4 shows frame 12 in position prior to insertion of attachment plate 26 into support 28 and FIG. 5 shows attachment plate 26 partially connected with support 28.

Figure 6:
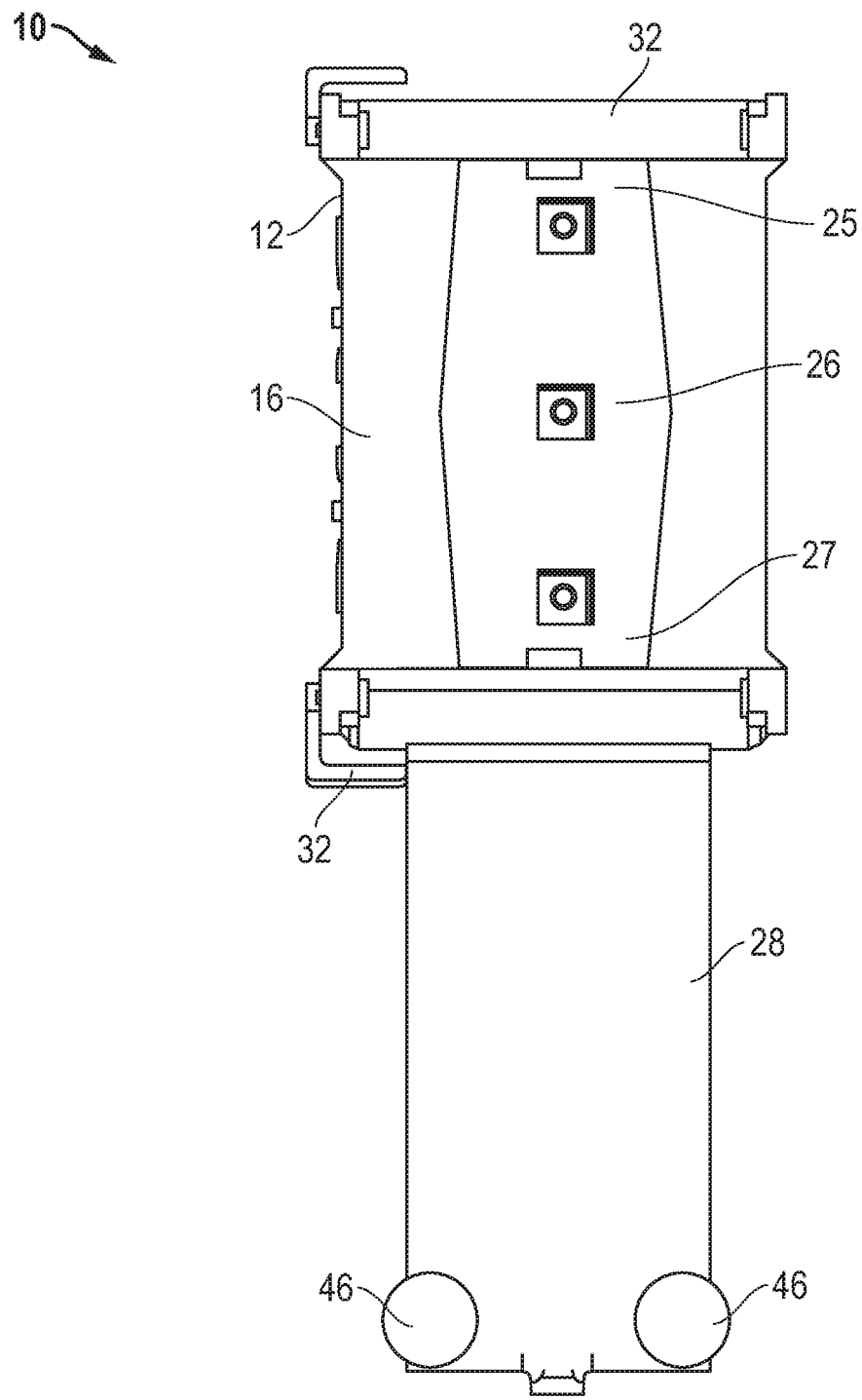
FIG. 6 is a view of the invention of FIG. 4 from the back showing the attachment plate.

FIG. 6 shows the back 16 of frame 12 and attachment plate 26 and the back of support 28 prior to connection. Suction cups 46 are shown on support 28 as Applicants have found them useful in securing support 28 with a window in addition to the curved lip of support 28 which fits on top of window edge 38.

Figure 7:
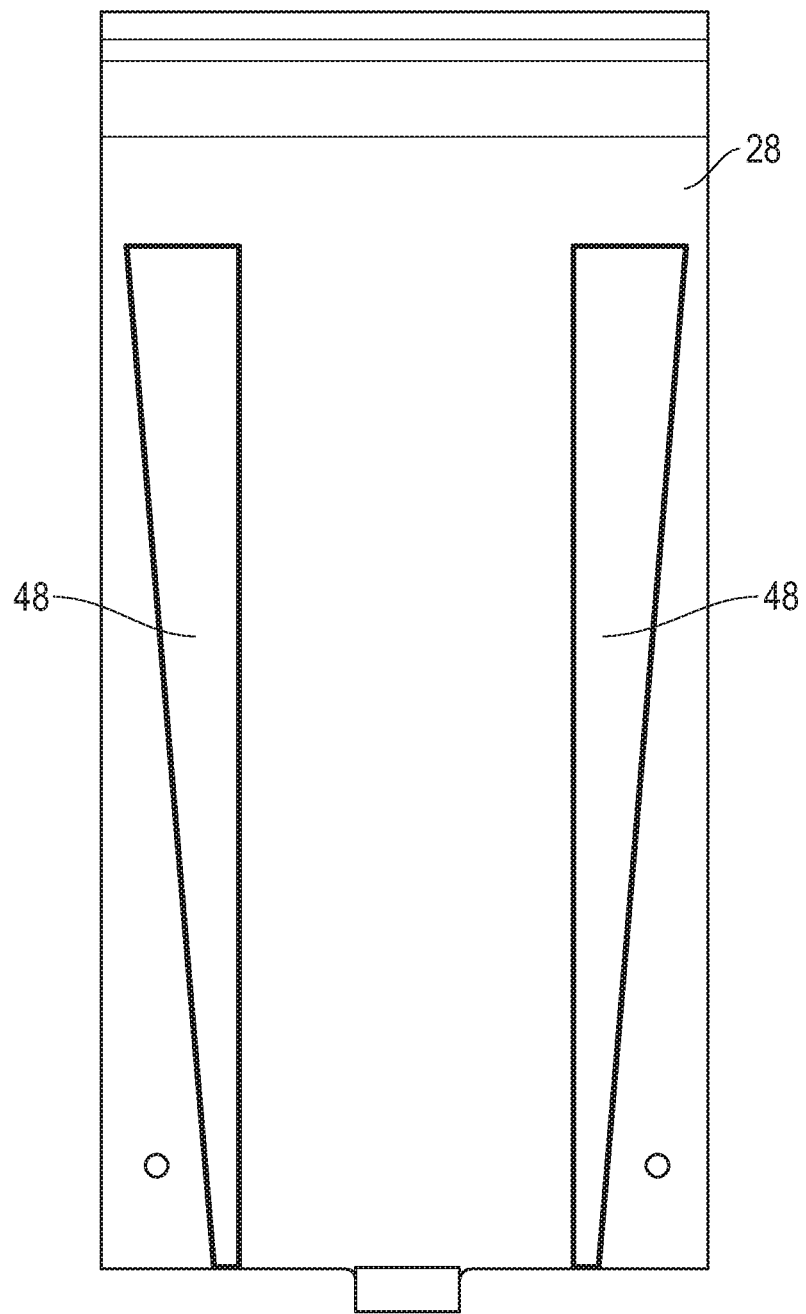
FIG. 7 is a back view of the support of the invention of FIG. 1.

FIG. 6 shows that preferably attachment plate 26 is tapered toward both ends, 25 and 27. This makes it easier to insert attachment plate 26 into support 28 no matter which end, 25 or 27, is inserted. FIG. 7 illustrates the receiving flanges in the support 28 into, underneath, which attachment, plate 26 fits.

Figure 8:
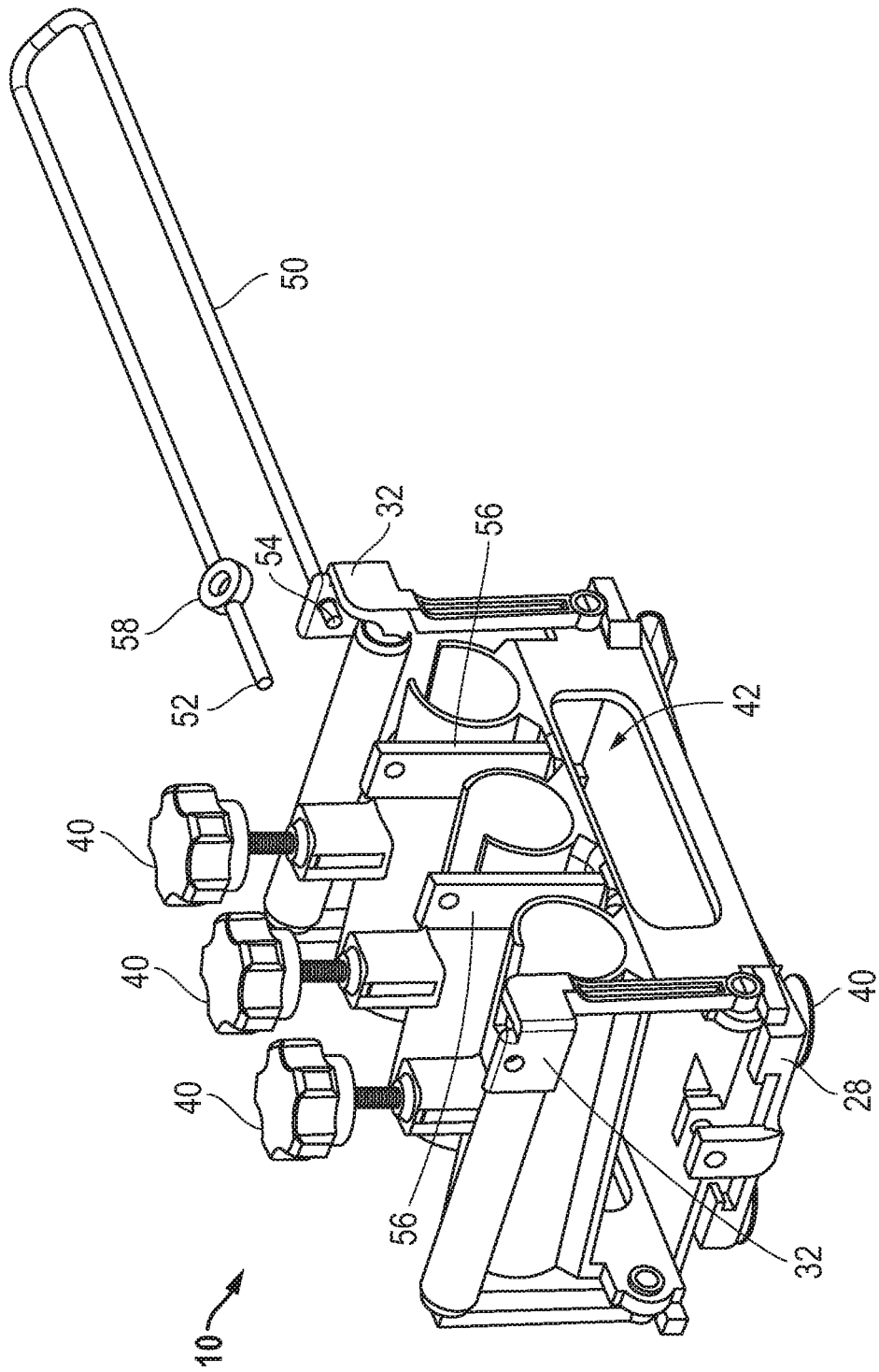
FIG. 8 is a perspective view of the invention of FIG. 1 showing a lock being connected with the handles and frame.
Figure 9:
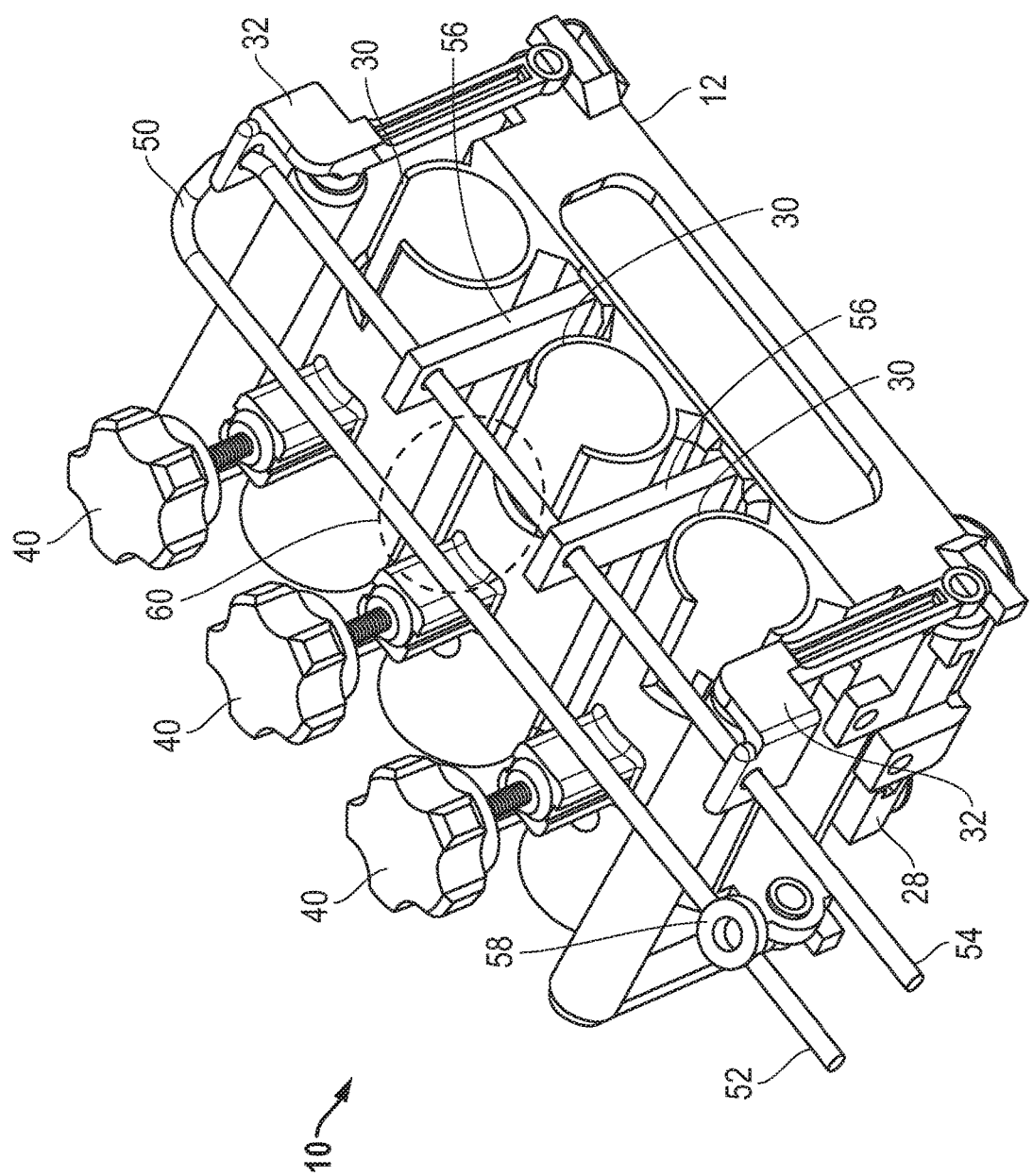
FIG. 9 is a perspective view of the invention of FIG. 8 with the lock fully in place.

FIGS. 8 and 9 illustrate the lock structure of the invention. Lock bar 50 has two free ends, 52 and 54. Preferably, when handles 32 are in the collapsed position shown, one end 54 is passed through a hole in handle 32, In one embodiment the frame 12 also includes lock posts 56 which are configured to receive one end 54 of the lock bar 50. FIG. 9 shows lock bar 50 with one end 54 completely threaded through both handles 32 and lock posts 56. End 52 is shown with a lock capture hole 58. By this structure, once lock bar 50 is connected through the handles 32 and lock posts 56 , the arms surround a reel 60, shown in dotted lines, A lock (not shown for clarity) is passed around one end 54 and through lock capture hole 58 and closed thereby locking the lock bar in place.

The description of the present embodiments of the invention has been for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A reversible rod holder apparatus comprising:
   a. a frame with a front, a back, a top side, a bottom side, a left side and a right side;
   b. an attachment plate directly connected with the back of the frame;
   c. a support wherein the support and the attachment plate are removably connectable; and
   d. a rod sleeve with a first end and a second end connected with the front of the frame along the front of the frame from the left side of the frame to the right side of the frame at an angle from the left side to the right side of the frame such that a rod placed in the rod sleeve is held at said angle such that one end of the rod sleeve is further from the back of the frame than the other end of the rod sleeve.

2. The apparatus of claim 1 further including a handle connected with the frame.

3. The apparatus of claim 1 further including a tether connected with the frame.

4. The apparatus of claim 1 wherein the attachment plate is oriented from the top side of the frame to the bottom side of the frame and is configured to removably connect with the support from either the top side of the frame or the bottom side of the frame.

5. The apparatus of claim 1 wherein the rod sleeve connection angle is approximately four degrees.

6. The apparatus of claim 1 wherein the support is removably connectable with another object.

7. The apparatus of claim 1 wherein said another object is a window in a vehicle.

8. The apparatus of claim 1 wherein the front of the frame is connected with the back of said frame at said angle such that said rod sleeve connected with the front of the frame is connected at said angle.

9. The apparatus of claim 1 wherein said rod sleeve is configured to include said angle such that said rod sleeve connected with the front of the frame is connected at said angle.

10. A reversible rod holder apparatus comprising:
    a. a frame with a front, a back, a top side, a bottom side, a left side and a right side;
    b. an attachment plate directly connected with the back of the frame wherein the attachment plate is oriented from the top side of the frame to the bottom side of the frame and is configured to removably connect with the support from either the top side of the frame or the bottom side of the frame;
    c. rod sleeves with a first end and a second end connected with the front of the frame along the front of the frame from the left side of the frame to the right side of the frame at an angle from the left side to the right side of the frame such that rods placed in the rod sleeves are held at said angle such that one end of each of the rod sleeves is further from the back of the frame than the other end of each of the rod sleeves;

d. clamps connected with the rod sleeves wherein the clamps are configured to hold rods in the rod sleeves; and e. a pair of handles are connected with the frame with one handle at the top side and one handle at the bottom side wherein the handles are configured to receive a lock such that rods in said rod sleeves are locked in place.

11. The apparatus of claim 10 further including a tether connected with the frame.

12. The apparatus of claim 10 wherein the rod sleeve connection angle is approximately four degrees.

13. The apparatus of claim 10 wherein the left side of the frame and the right side of the frame are connected to the frame such that the front of the frame is spaced apart from the back of the frame and wherein one side extends further from the back than the other side such that the front is connected with the first side and the second side at said angle.

14. The apparatus of claim 11 wherein the left side and the right side include side holes.

15. The apparatus of claim 10 wherein the rods include reels and said rod sleeves include reel receiving cut outs.

16. The apparatus of claim 15 wherein said lock is configured to lock around reels in the reel receiving cut outs.

17. The apparatus of claim 10 wherein the frame includes lock posts configured to receive a lock.

18. The apparatus of claim 17 wherein the support is removably connectable with another object and wherein said another object is a window in a vehicle.

19. A reversible rod holder method consisting of:

a. providing a frame with a front, a back, a top side, a bottom side, a left side and a right side;

an attachment plate directly connected with the back of the frame; a support wherein the support and the attachment plate are removably connectable; a rod sleeve with a first end and a second end connected with the front of the frame along the front of the frame from the left side of the frame to the right side of the frame at an angle from the left side to the right side of the frame such that a rod placed in the rod sleeve is held at said angle such that one end of the rod sleeve is further from the back of the frame than the other end of the rod sleeve; and b. connecting the attachment plate with the support.

20. The method of claim 19 further including the steps of:

a. connecting the support with another object; and b. placing a rod in the rod sleeve.

* * * * *